(12) United States Patent
Sakai et al.

(10) Patent No.: US 7,330,825 B2
(45) Date of Patent: Feb. 12, 2008

(54) CONTROL SYSTEM

(75) Inventors: Atsushi Sakai, Sakaki-machi (JP); Hiroaki Hayashi, Ueda (JP); Toshiyuki Sugimoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 567 days.

(21) Appl. No.: 10/124,559

(22) Filed: Apr. 17, 2002

(65) Prior Publication Data
US 2003/0061021 A1 Mar. 27, 2003

(30) Foreign Application Priority Data
Apr. 17, 2001 (JP) .............................. 2001-118769

(51) Int. Cl.
*G06Q 20/00* (2006.01)
(52) U.S. Cl. ....................................................... 705/16
(58) Field of Classification Search .................. 705/16, 705/17, 20; 717/108, 116; 710/8, 10
See application file for complete search history.

(56) References Cited

U.S. PATENT DOCUMENTS 5,758,070 A * 5/1998 Lawrence ................... 709/220
6,201,996 B1 * 3/2001 Crater et al. .................... 700/9
6,405,099 B1 * 6/2002 Nagai et al. ................. 700/159
6,691,302 B1 * 2/2004 Skrzynski et al. ........... 717/118
6,788,980 B1 * 9/2004 Johnson .......................... 700/1
6,820,255 B2 * 11/2004 Babaian et al. ............. 717/151
2004/0254648 A1 * 12/2004 Johnson et al. ................. 700/1

OTHER PUBLICATIONS

Java for Retail POS Commitee: "Java for Retail POS, Version 1.5", International Standard [Online], for Implementation of POS Peripherals on a Java Based System, Sep. 24, 2000, pp. 1-54.

* cited by examiner

*Primary Examiner*—Ronald Laneau

(57) ABSTRACT

A simplified control system provides a uniform interface to a Java-based POS application. A new interface defining a method SetEntry for passing an entry point to a database to a device service object is created in the device service object which loads this interface as a rule. This allows greater freedom designing the device service object and makes it possible to write better service objects. Device service objects for other manufacturers and other types of devices can also be loaded by a shared factory class, and a simpler JavaPOS system can be provided at low cost.

14 Claims, 3 Drawing Sheets

CONTROL SYSTEM

BACKGROUND OF THE INVENTION

1. Field of the Invention

The present invention relates to a control system using software components executed on a Java Virtual Machine (JVM) platform. More particularly, this invention relates to an object-software-based control system which includes one or more additional interfaces that provide the system with more versatility and flexibility.

2. Description of the Related Art

Component based programs comprise reusable software components written in an object-oriented programming language that run under an operating system. A wide range of application programs and systems have been written using such components. Programs written in Java® (called Java applications or applets) only require a JVM in order to run, and can be used under any operating system providing JVM support regardless of the type or version of the operating system. A Java application is therefore operating system independent and will run on a system using the Microsoft Windows® operating system, on a system using the Linux operating system, and on systems that have their operating systems implemented as microcode in a dedicated computer chip. Java applications therefore enable an enterprise to protect its software resources because the applications do not depend on a particular operating system. More specifically, developers do not need to develop a Java application for a particular operating system; development therefore costs less than developing multiple versions of the same application for multiple operating systems. The user is also not tied to a particular operating system, and is therefore free to choose from a wider range of operating systems. Developers and users can also continue to use existing software resources even when the operating system is changed or updated.

A point-of-sale (POS) system is exemplary of a system built from a variety of hardware components, typically including a host computer, such as a personal computer, to which a display, printer, scanner, cash drawer, card reader, and other input/output devices are connected. A Java application that does not depend upon the host computer's specifications enables a user to deploy a new POS system using existing hardware and to upgrade or expand the hardware without losing compatibility with the POS application. Application development costs can also be reduced, thereby further reducing the burden on the user. There is also greater flexibility in selecting the hardware. More options are therefore available to the user; a POS system matching the actual user environment can therefore be built more easily. A POS system written as a Java application therefore offers numerous advantages for the user.

The concept of a Java POS system is described below with reference to FIG. 1. This POS system 10 has a POS application program (application) 11 provided by the POS system manufacturer; device control objects 12 (first object or device control) supplied for each type of peripheral device (i.e., device class) such as a printer 21, scanner 22, or cash drawer 23; and device service objects 13 (second object or device service) provided for each particular peripheral device. The peripheral devices 21 to 23 controlled by the respective device services 13 are connected through respective port drivers 14 that control the input/output ports, which may be serial, parallel, or USB, for example, to a personal computer 18 or other host on which the application 11 and other object programs run. In order for the application 11 to print using the printer 21, for example, the application 11 first passes data to the printer control object 12, which passes the data to the device service 13 for the manufacturer and model of printer selected for output. The device service 13 then supplies the data to the printer 21 through port driver 14.

The object control system 19 comprising device controls 12 and device services 13 in the Java POS system 10 shown in FIG. 1 provides the application 11 with an interface that does not depend upon the particular peripheral devices (such as the printer 21) in the system. The application 11, device controls 12, and device services 13 are software programs written in the Java programming language and converted to Java byte code by a compiler so that they will run on a JVM. The JVM converts the Java byte code to code specific to the operating system installed on the host 18 and runs the converted code. The application 11, device controls 12, and device services 13 therefore provide uniform services independent of the operating system.

FIG. 2 shows that part of the object control system 19 that controls a particular device, specifically the printer 21 in this example. The device control 12 provides the application 11 with an interface 12*i* (first interface) to a printer (device class). Similarly, the device service 13 provides the device control 12 with an interface 13*i* (second interface) to a specific printer 21 (device). An instance of the device service 13 is created when the device control 12 calls the device service 13 to access a specific printer 21, and this instance is used as the device service 13.

The object control system 19 therefore has a JCL Opos config/loader) object 31 (third object) and a factory class object 34 (fourth object, sometimes called "FC" below). The JCL object 31 is called by the device control 12 to address a specific printer by name and connect to or disconnect from the printer. The FC 34 creates an instance of the device service 13 as instructed by the JCL object 31.

The object control system 19 also maintains a database 33 written in XML (eXtensible Markup Language), for example, of conditions, settings, and other information used by the FC 34 to create an instance of the device service 13, and a name resolution object 32 such as an XML parser for getting a name (logical device name) information entry point to the database 33. The JCL object 31 therefore has an interface 31*i* (third interface) used by the device control 12 to specify the printer name, and the FC 34 has an interface 34*i* (fourth interface) enabling the JCL object 31 to specify an entry point.

An XML database manages data in "entry" units, and all information relating to a specific device is stored to the same entry. An entry point is the address for a particular entry. An XML parser is a software structure for interpreting a database written in XML.

An object control system 19 as described above thus distributes various functions to a variety of objects to provide a uniform interface to the application 11, and requires a minimal number of software components to use a variety of devices. For example, the manufacturer of the device (printer) 21 provides a device service 13 for the particular device 21 and a FC 34 for generating an instance of that device service 13, and the user then simply installs these software components on the host 18 in order to make the desired device 21 available to the POS system.

SUMMARY OF THE INVENTION

It is an object of this invention to provide a way to easily construct a distributed system able to control a large number of devices using Java, and to also provide a system for easily and precisely developing and providing device services.

The object control system 19 shown in FIG. 2 assumes that the FC 34 is provided by the manufacturer together with the device service 13, and offers flexibility and freedom of design because the manufacturer is responsible for matching the FC 34 with the device service 13 for which the FC 34 creates instances and controls how parameters and settings are passed to a device service 13 instance. That is, if the FC 34 can provide all of the information required for the device service 13 to run, the device service 13 does not need to access the database 33, and if the device service 13 needs to access the database 33, the FC 34 can pass the entry point to the device service 13 using a suitable method.

The inventors have discovered, however, that by providing the device service 13 with an interface enabling the device service 13 to get an entry point from the FC 34, the FC 34 can be provided as a program independent of the device service 13, and a device can be incorporated into the system with the device manufacturer providing only the device service 13.

Furthermore, when these programs are developed on the assumption that the FC 34 and device service 13 will be provided as a paired set of objects, a function (also called a method) for getting an entry point is provided in the device service, and the FC provides the device service with an entry point cast (converted) to the type of the device service class. While passing entry points with this method poses no particular problem when there is a 1:1 correlation between service object and factory class objects, a superclass common to all device services is needed if the factory class object is common to the device services, and device service development efficiency drops significantly.

The inventors have found that casting is not necessary if the device service has an interface for retrieving entry points; device service development is also made easier.

Providing the device service with an interface for retrieving entry points enables greater freedom in service object development, provides a factory class object that can easily be loaded even with device services from other manufacturers, and thus makes it easy to build a system that runs on a JVM platform and handles numerous devices.

According to one aspect of the invention, a control system operating on a Java Virtual Machine platform is provided. The control system comprises a first object providing a first interface for each device class to an application program that is able to control devices of a plurality of device classes; a second object providing to the first object a second interface for each device; a third object providing a third interface for connecting the second object to, or disconnecting the second object from, the first object; a database storing information for setting and loading the second object; and a fourth object providing a fourth interface to the third object for obtaining an entry point to a database record keeping information on the second object, and for creating a second object for any one of the devices. The second object also provides a fifth interface to the fourth object for obtaining the entry point.

Information recorded in the database and needed to load the second object includes, for example, the logical device name, the service instance factory class name (class name of FC 34), the service class name (class name of device service 13), and the device category (type). Information needed to instantiate the second object includes, for example, the communication parameters and other information related to the device specifications.

According to another aspect, the present invention provides a program (that is, a device service) adapted to be run on a JVM. The program functions as a second object for providing, to a first object (that is, a device control) that provides a first interface for each device class to an application program that is able to control devices of a plurality of device classes. The program has a command (instruction) for providing a fifth interface for obtaining an entry point to a fourth object, which is adapted to create the second object for a corresponding device and to provide a fourth interface to a third object for obtaining an entry point to a database record keeping information on the second object, the third object being adapted to provide a third interface to the first object for connecting the second object to, and disconnecting the second object from, the first object.

According to another aspect, the present invention provides a program (that is, a factory class) adapted to be run on a JVM. The program functions as a fourth object for instantiating a second object providing, to a first object that provides a first interface for each device class to an application program that is able to control devices of a plurality of device classes, a second interface for each device. The program has a command (instruction) for providing a fourth interface to a third object for obtaining an entry point to a database record keeping information on the second object, the third object providing a third interface to the first object for connecting the second object to, and disconnecting the second object from, the first object; and a command (instruction) for providing the retrieved entry point by means of a fifth interface provided by the second object to the fourth object.

In a control system having a second object (device service object) and fourth object (FC object), according to the present invention the fourth object can pass a database entry point obtained from the third object (the JCL object) to the second object using an interface provided by the second object. The present invention can thus provide a factory class object able to instantiate device services for devices from a plurality of different manufacturers. It is therefore possible to incorporate devices from different manufacturers into a control system according to the present invention, that is, a control system providing an application with a uniform interface for accessing multiple devices, with the device manufacturer providing only the device service object to the user.

Furthermore, by sharing the factory class object for loading a device service in the present invention, the device service, which must be developed for each device, does not need to be derived from a shared class. Each manufacturer can thus freely develop device services for each device without providing a superclass common to all manufacturers. Even further, changes to a device service do not affect the superclass, thus facilitating device service debugging and enabling efficient software development.

The objects of a control system according to the present invention as noted above are programs (of instructions) to be executed by a machine for carrying out the processes as described herein. These programs can be recorded on Compact Disc or any other suitable computer-readable data storage medium, distributed over a computer network, or run from any data storage medium used by a computer supporting the JVM.

While devices as referred to herein can be virtual structures, the present invention simplifies the control system and facilitates developing device services, and is therefore suited to control systems for handling printers, scanners, and other such peripheral devices where device performance and specifications differ according to the manufacturer or model and for which device services therefore also differ. More specifically, the present invention is ideally suited to a control system for providing a uniform interface to an application where the devices are peripheral devices of a host computer such as a personal computer. The present invention is therefore suited to a control system in which the above first object is a device control object provided for each type of peripheral device, the second object is a device service object provided for each peripheral device, and the application program is a POS application program.

Other objectives and attainments together with a fuller understanding of the invention will become apparent and appreciated by referring to the following description and claims taken in conjunction with the accompanying drawings.

DESCRIPTION OF THE PREFERRED EMBODIMENTS

Figure 1:
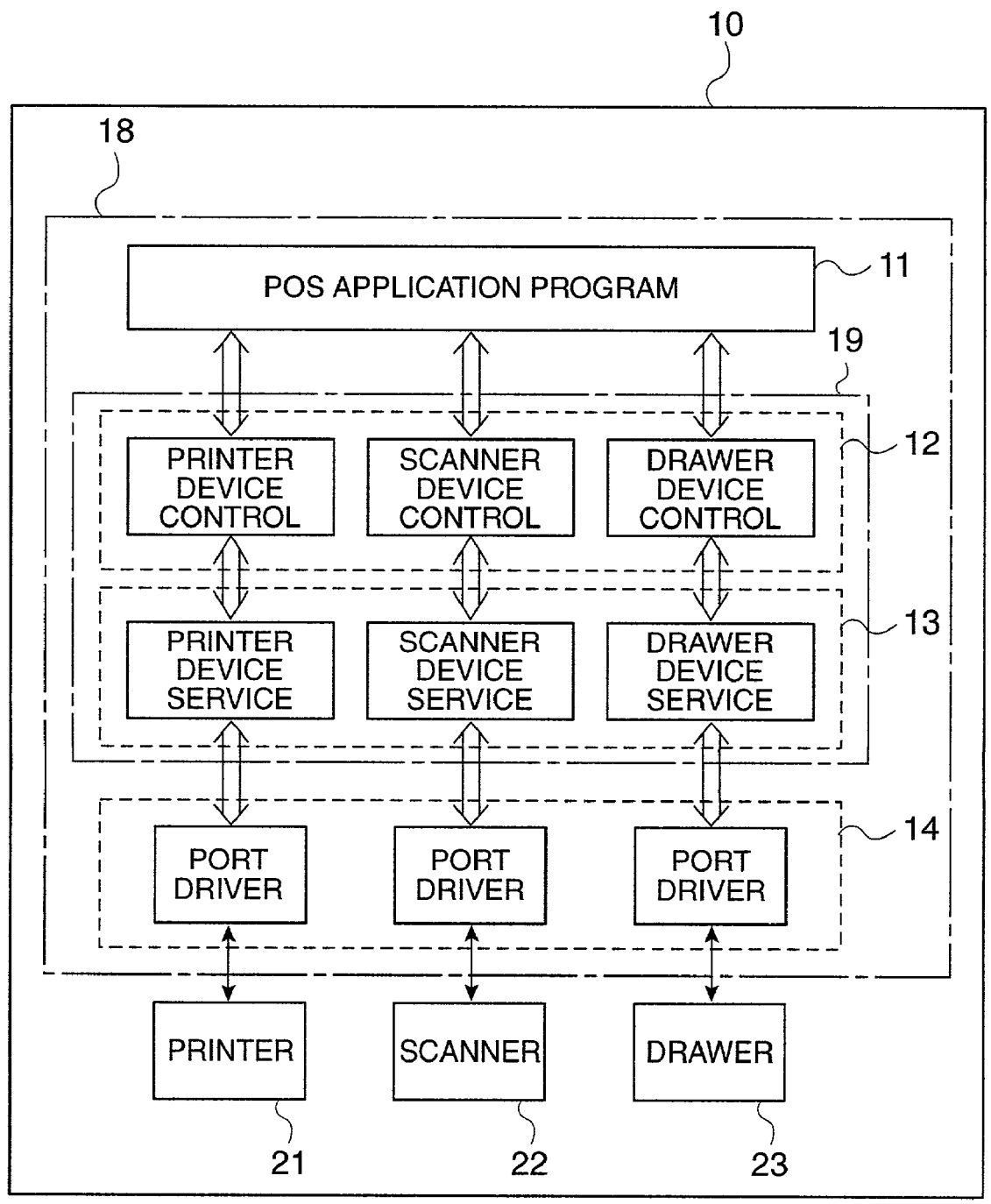
FIG. 1 illustrates the concept of a POS system based on object services.

The present invention is described in detail below with reference to the Java POS system 10 shown in FIG. 1 and FIG. 2 and described above.

Figure 2:
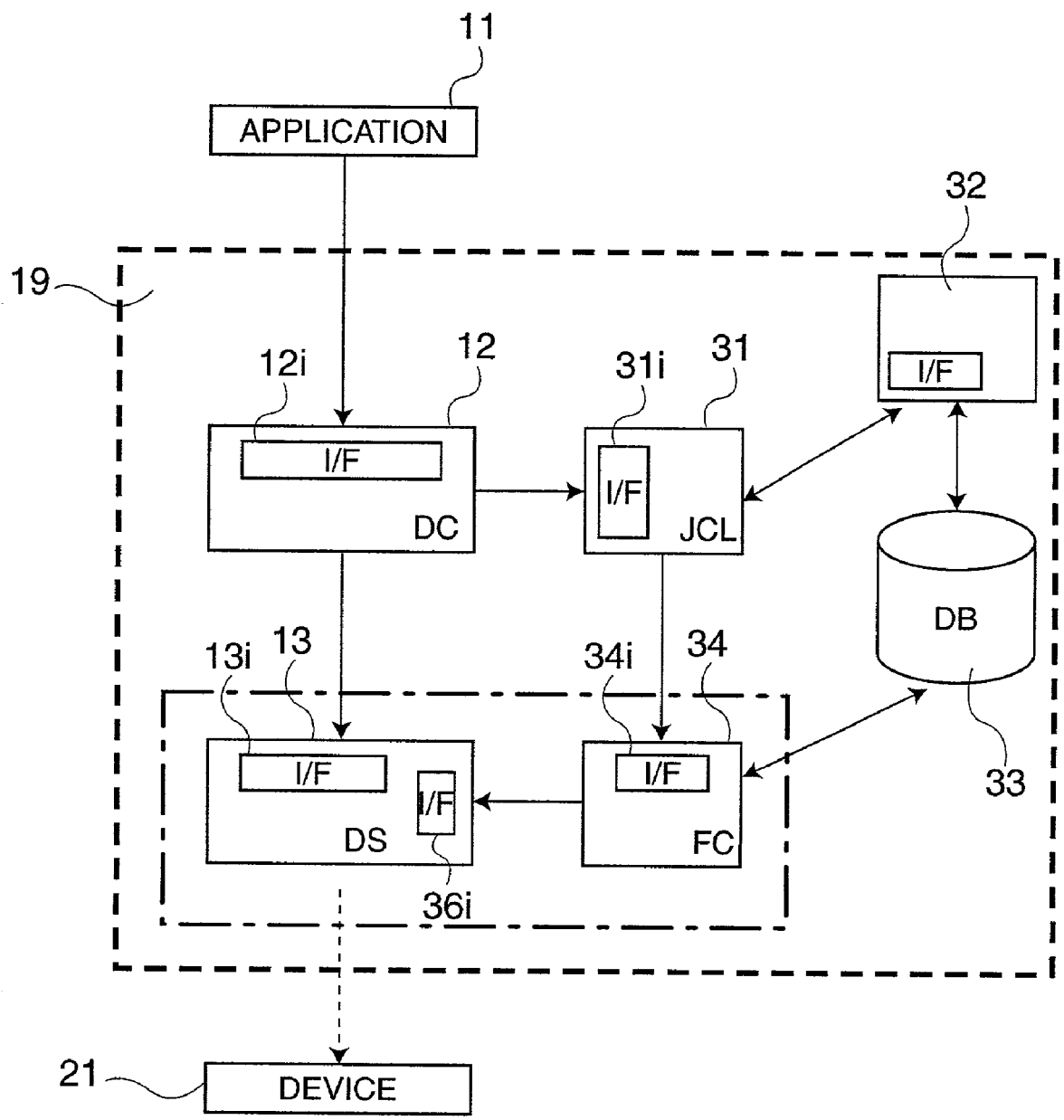
FIG. 2 illustrates a control system for the Java Virtual Machine platform in which the device service objects do not provide an interface for getting database entry points.

Exemplary code for a FC 34 is shown below when a method for passing an entry point is built directly into the device service 13 rather than being defined by the interface in a object control system 19 as shown in FIG. 2.

```
** Factory class, example 1 **
//method name="createInstance"
//parameter "logical name"=name of logical device
//parameter "entry"=database entry point
//type of returned value="JposServiceInstance"
//exception="JposException"
public JposServiceInstance createInstance (String logicalName, JposEntry entry) throws JposException
{
  //check for a DeviceService name property
  if (!entry.hasPropertyWithName(JposEntry.
     SERVICE_CLASS_PROP_NAME))
    //throw exception if there is no DeviceService name property
    throw new  JposException(JposConst.JPOS_E_NOSERVICE,"");
  //get name of DeviceService class
  String serviceClassName =
    (String)entry.getPropertyValue(JposEntry.
       SERVICE_CLASS_PROP_NAME);
  //declare name of instance of DeviceService(JposServiceInstance)      type       JposServiceInstance
      serviceInstance=null;
  try
  {
    //instantiate DeviceService Constructor object
    Class serviceClass=Class.forName(serviceClassName);
    Class[ ] params=new Class[0];
    Constructor ctor=serviceClass.getConstructor(params);
    //get DeviceService with JposServiceInstance interface
    serviceInstance=(JposServiceInstance)ctor.newInstance
      (params);
      cast instance as DeviceService class, pass database entry
        point to DeviceService . . . (A)
    ((DeviceServiceName)serviceInstance).setEntry(entry);
  }
  //report exception if an exception is thrown in the above
     try{ }
  catch(Exception e)
  {
  throw  new  JposException(JposConst.JPOS_E_NOSERVICE,
  "Could not create service instance.");
  }
  //return "serviceInstance" as method result to the invoking
     object (JCL) return serviceInstance;
}
```

The problem in this first code sample for FC 34 is at the point marked (A) in the code above, where an instance of the device service 13 must be cast to the type of the device service 13 class in order to pass a database entry point. More specifically, because the instance (serviceInstance) of the device service 13 created in this first code sample is the JposServiceInstance-type of the interface class, it must be cast to the class of device service 13. However, because a device service 13 is written for each device, different service objects cannot use the same name with this method, and the two solutions described below are the only ways to load the device service 13 and pass an entry point to that instance of its class. These solutions, however, reduce the efficiency of object development and impose significant limitations on program design.

The first solution is to write a FC 34 for the device service 13 of each device. This means the FC 34 and device service 13 must always be provided as a pair. The object control system 19 shown in FIG. 2 is developed on this premise and has no particular problem with this solution. The purpose of the FC 34, however, is to create an instance of the device service 13. While a device service 13 must be provided for each device, there is no other good reason to provide a FC 34 for every device, and hence the need to provide a FC 34 paired to each device service 13 is a major obstacle to simplifying system development.

Furthermore, storing a FC 34 for each device service 13 in the object control system 19 significantly increases the number of objects as the number of devices handled by the object control system 19 increases, and is undesirable in a distributed system.

Another problem is that it may or may not be necessary to update the FC 34 when the device service 13 is updated.

It is therefore desirable for the FC 34 to function independently of the device service 13, and to be an object shared by multiple device services 13.

The second solution is to create a superclass shared by all device services 13, and provide a superclass method for getting an entry point to database 33. With this method the FC 34 can use the same command to pass an entry point to all device services 13, and this method is therefore preferable in a distributed system. When writing a device service 13, however, this method is limited by the need to inherit a superclass shared by device services for all devices of all manufacturers, or to inherit a superclass shared by device services for all devices in a certain device range, such as all devices in a particular category (type) or all devices from a particular manufacturer. This not only limits the freedom of the design of the device service 13, it could also create a significant bottleneck to device service development because when the superclass is updated it may be necessary to reexamine all device service objects that inherit that superclass.

Figure 3:
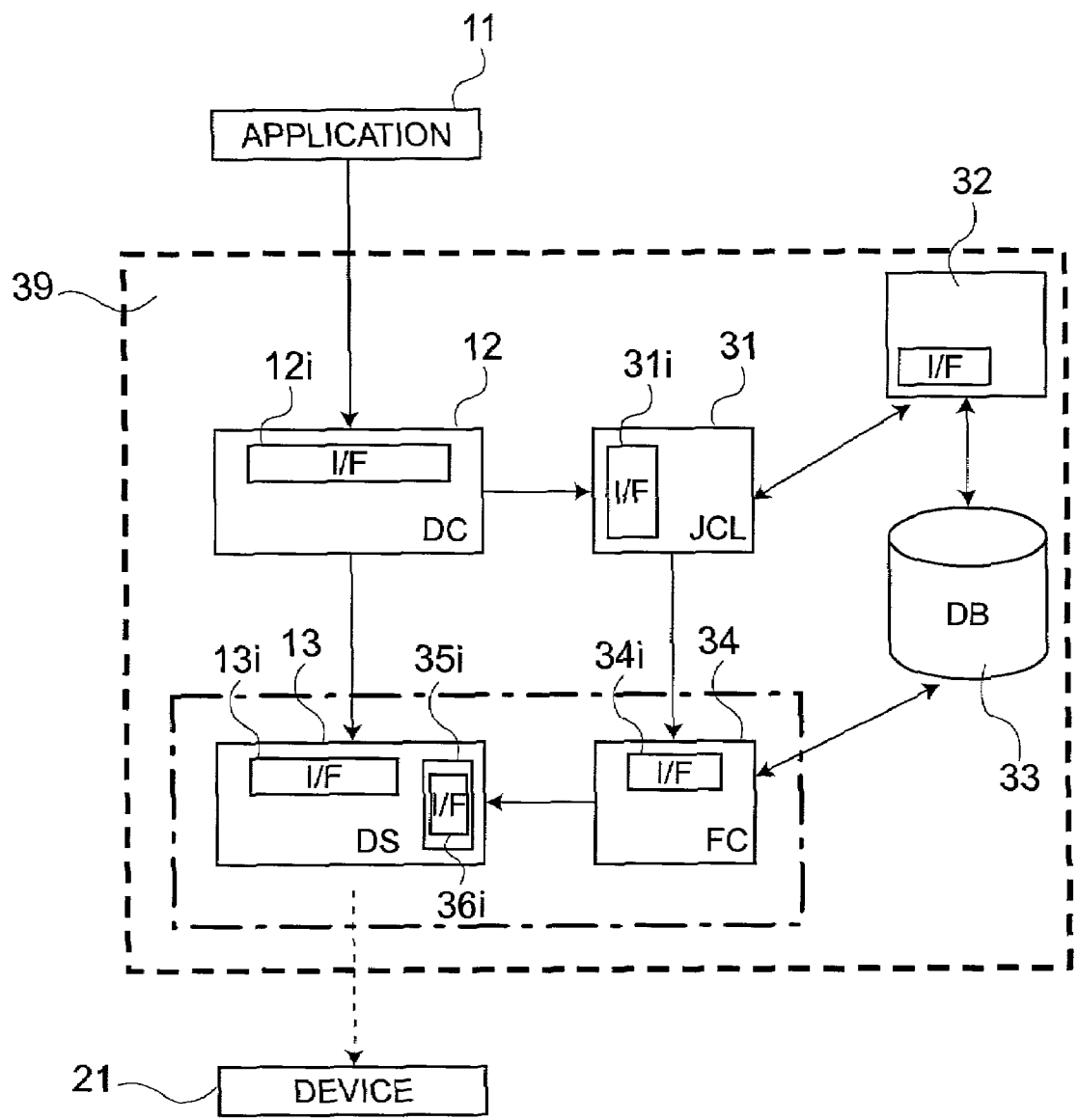
FIG. 3 illustrates a control system according to the present invention for the Java Virtual Machine platform in which the device service objects provide an interface for getting database entry points.

FIG. 3 shows the configuration of a control system 39 according to embodiments of the present invention. This control system 39 solves the problems of the two solutions described above by providing the device service 13 with an interface 35*i* for obtaining an entry point. The device service 13 can therefore be freely developed and designed for specific devices, and the FC 34 can be designed to be shared by each of the device services 13. The device service 13 for devices of different types and for devices from other manufacturers can be loaded by the FC 34.

The control system 39 shown in FIG. 3 is a system for controlling a particular device, such as a printer 21. All programs and objects operate on the JVM platform. As in the configuration shown in FIG. 2, device control 12 has an interface 12*i* (first interface) to each device class (e.g., the printer device class) for the application 11 in this control system 39, and the device service 13 has an interface 13*i* (second interface) which provides the device control 12 with an interface to a specific device (e.g., a specific printer 21).

The control system 39 also has a JCL object 31 called by the device control 12 to address a specific printer by name and connect or disconnect to the printer, and a FC 34 for creating an instance of the device service 13 as instructed by the JCL object 31. The control system 39 stores conditions, settings, and other information used by the FC 34 to create an instance of the device service 13 in a database 33, and has an object 32 for name resolution. The JCL object 31 also has a third interface 31*i* used by the device control 12 to specify a printer name, and the FC 34 has a fourth interface 34*i* enabling the JCL object 31 to specify an entry point. The device service 13 has a fifth interface 35*i* enabling an entry point to be passed from the FC 34.

Exemplary code for a FC 34 able to pass a database entry point in this control system 39 is shown below.

```
**Factory class, example 2 **
//method name="createInstance"
//parameter "logical name"=name of logical device
//parameter "entry"=database entry point
//type of returned value="JposServiceInstance"
//exception="JposException"
public JposServiceInstance createInstance(String logicalName, JposEntry entry) throws JposException
{
    //check for a DeviceService name property
if (!entry.hasPropertyWithName(JposEntry.
    SERVICE_CLASS_PROP_NAME))
    //throw exception if there is no DeviceService name
        property
throw new JposException(JposConst.JPOS_E_NOSERVICE,"");
    //get name of DeviceService class
String serviceClassName=
(String)entry.getPropertyValue(JposEntry.
    SERVICE_CLASS_PROP_NAME);
    //declare instance name of DeviceService(EpsonJposServiceInstance)    type    EpsonJposServiceInstance
        serviceInstance=null;
try
{
    //create DeviceService Constructor object
Class serviceClass=Class.forName(serviceClassName);
Class[ ] params=new Class [0];
Constructor ctor=serviceClass.getConstructor(params);
    //get DeviceService with EpsonJposServiceInstance interface
serviceInstance=(EpsonJposServiceInstance)ctor.newInstance(params);
    //pass database entry point to DeviceService . . . (B)
serviceInstance.setEntry(entry);
{
    //report exception if an exception is thrown in the above
        try{ }
catch(Exception e)
{
throw new JposException(JposConst.JPOS_E_NOSERVICE,
"Could not create service instance.");
}
    //return "serviceInstance" as method result to the invoking
        object (JCL) return serviceInstance;
}
```

As shown at a point marked (B) in the above sample code for this FC 34 the device service is given a new EpsonJposServiceInstance interface defining the method SetEntry for passing a database entry point, and casting to the type of the service object class is therefore not necessary in order to pass the database entry point as it is in the first code sample shown above. It is therefore no longer necessary to provide a FC 34 for each device service 13, and the FC 34 can be provided as an object providing shared services to various device services 13. Furthermore, by providing a new EpsonJposServiceInstance interface (interface 35*i*) defining a SetEntry method for all device services 13, it is not necessary to inherit the shared superclass, and a limitation on device service development is thus removed.

The current Java POS standard requires providing the service object with an interface 36*i* to the JCL object 31, but this interface (JposServiceInstance) defines only one method (deleteInstance) indicating that a connection was interrupted. Exemplary code for this is shown below.

```
**Interface code, example 1 **
public interface JposServiceInstance
{
    public void deleteInstance( ) throws JposException
}
```

The control system 39 according to this embodiment of the invention thus creates the new interface EpsonJposServiceInstance, which inherits JposServiceInstance and defines the SetEntry method, and the device service provides the interface. Exemplary code providing the device service interface of this example is shown below.

```
**Interface code, example 2 **
public interface EpsonJposServiceInstance extends JposServiceInstance
{
    public void setEntry(JposEntry entry);
}
```

As described above the JposServiceInstance interface defining communication between the JCL object 31 used when the device control 12, which is a level above the device service 13, loads the device service 13 and the device service 13 is defined when a device service 13 is loaded according to the current specification. As also noted above, however, the JposServiceInstance interface does not allow for the FC 34 passing a database entry point used by the device service 13 to the device service 13. Therefore, the method whereby an entry point is obtained when the device service 13 requires an entry point is not uniform between service objects for different devices (such as printers and scanners) or between vendors providing the service objects.

A device service 13 integrated into the control system 39 according to the present invention and creating the new interface (EpsonJposServiceInstance) defining a method (SetEntry) for passing a database entry point to the device service 13 as described above provides this interface as a rule. This offers greater freedom designing the device service 13 and enables writing an even better device service 13.

Furthermore, device services 13 from other vendors and device services 13 for other types of devices can also be loaded by the common FC 34, and a Java-based POS system can be provided more simply at low cost.

A service object (device service) 13 and factory class object (FC) 34, used in constructing a Java-based POS control system 39 according to embodiments of the invention, are Java applications or Java applets having commands for providing the above-described interface and passing entry points using the interface. According to an aspect of the invention, the Java applications/applets can be recorded on a Compact Disc, or any other suitable type of computer-readable data storage medium, for distribution. Moreover, these Java applications/applets operate on any JVM, and can therefore achieve the functionality described above independently of the operating system on any computer supporting the JVM.

It will be noted that while the present invention has been described with reference to a POS system controlling a wide variety of peripheral devices, the present invention is not so limited. More broadly, the present invention can be used with any system providing integrated control of various peripheral devices on the JVM platform, including factory automation systems and robotic control systems.

As described above, when a device service object providing an interface to a particular device is loaded and the device control object a level above the device service object connects to the device service object through the JCL (jpos config/loader) object in the present invention, the device service object instance is provided with a fifth interface enabling the service object to get a database entry point from the factory class so that when the factory class loads the device service object it can pass a database entry point to the service object using the fifth interface. It is therefore possible for a shared factory class in a control system having a device service object providing a fifth interface according to the present invention to load device service objects from other vendors and device service objects for other types of devices. A simple, low cost control system suited to a POS system, for example, providing a uniform interface to Java-based applications can therefore be provided.

Furthermore, because each device service object can get a database entry point from the factory class by simply providing a fifth interface according to the present invention, it is not necessary to provide and inherit a superclass shared by each manufacturer, and device service objects can be designed with greater freedom. It is therefore possible to provide high quality device service objects that a are compatible with a shared factory class and well suited to applications handling a variety of devices.

While the invention has been described in conjunction with several specific embodiments, further alternatives, modifications, variations and applications will be apparent to those skilled in the art in light of the foregoing description. Thus, the invention described herein is intended to embrace all such alternatives, modifications, variations and applications as may fall within the spirit and scope of the appended claims.

What is claimed is:

1. A control system a portion of which is embodied on a computer-readable media and operating on a Java Virtual Machine platform, said control system comprising:
   a device control object provides a first interface for each of a plurality of device classes to an application program that controls devices of the plurality of device classes;
   a device service object provides to the device control object a second interface for each device of the device classes;
   a config/loader object provides a third interface for connecting the device service object to, or disconnecting the device service object from, the device control object;
   a database for storing information for setting and loading the device service object; and
   a factory class object provides a fourth interface to the config/loader object, to obtain an entry point to a database record keeping the information on the device service object, and to create the device service object for any one of the devices;
   wherein the device service object further provides a fifth interface to the factory class object for passing the entry point from the factory class object to the device service object.

2. The control system of claim 1, wherein the factory class object instantiates the device service object for devices from a plurality of different manufacturers.

3. The control system of claim 1, wherein each device is a peripheral device of a host computer.

4. The control system of claim 3, wherein the device control object is provided for each class of peripheral device, and the device service object is provided for each peripheral device.

5. The control system of claim 3, wherein the application program is a point-of-sale application program.

6. A program embodied on a computer-readable media and runs on a Java Virtual Machine, the program functioning as a device service object provides to a device control object, that provides a first interface for each of a plurality of device classes to an application program, that controls devices of the plurality of device classes, a second interface for each device, said program comprising:
   a command provides a fifth interface to a factory class object for passing an entry point from a factory class object to the device service object,
   wherein the factory class object creates the device service object for the corresponding device, to provide a fourth interface to a config/loader object, and to obtain an entry point to a database record keeping information on the device service object, the config/loader object provides a third interface to the device control object for connecting the device service object to, and disconnecting the device service object from, the device control object.

7. The program of claim 6, wherein each device is a peripheral device of a host computer.

8. The program of claim 7, wherein the device control object is provided for each class of peripheral device, and the device service object is provided for each peripheral device.

9. The program of claim 7, wherein the application program is a point-of-sale application program.

10. A program embodied on a computer-readable media and runs on a Java Virtual Machine, the program functioning as a factory class object for instantiating a device service object provides to a device control object, that provides a first interface for each of a plurality of device classes to an application program, that controls devices of the plurality of device classes, a second interface for each device, said program comprising:
- a command provides a fourth interface to a config/loader object, and to obtain an entry point to a database record keeping information on the device service object, the config/loader object provides a third interface to the device control object for connecting the device service object to, and disconnecting the device service object from, the device control object; and
- a command passes the entry point by means of a fifth interface provided by the device service object to the factory class object.

11. The program of claim 10, wherein the factory class object creates the device service object for devices from a plurality of different manufacturers.

12. The program of claim 10, wherein each device is a peripheral device of a host computer.

13. The program of claim 12, wherein the device control object is provided for each class of peripheral device, and the device service object is provided for each peripheral device.

14. The program of claim 12, wherein the application program is a point-of-sale application program.

* * * * *